(12) United States Patent
Günther et al.

(10) Patent No.: US 7,356,201 B2
(45) Date of Patent: Apr. 8, 2008

(54) PROCESS AND DEVICE FOR THE AUTOMATIC RECTIFICATION OF SINGLE-CHANNEL OR MULTI-CHANNEL IMAGES

(75) Inventors: Adolf Günther, Neustrelitz (DE); Erik Borg, Joachimstal (DE); Bernd Fichtelmann, Neustrelitz (DE)

(73) Assignee: Deutsches Zentrum Für Luft- und Raumfahrt e.V., Bonn (DE)

( * ) Notice: Subject to any disclaimer, the term of this patent is extended or adjusted under 35 U.S.C. 154(b) by 695 days.

(21) Appl. No.: 10/722,673

(22) Filed: Nov. 25, 2003

(65) Prior Publication Data
US 2004/0208396 A1    Oct. 21, 2004

(30) Foreign Application Priority Data
Nov. 25, 2002   (DE)   ............................. 102 55 557

(51) Int. Cl.
G06K 9/32   (2006.01)

(52) U.S. Cl. ..................... 382/294; 382/278

(58) Field of Classification Search ............... 382/294, 382/113, 293, 278, 295; 348/114
See application file for complete search history.

(56) References Cited

U.S. PATENT DOCUMENTS

| | | | | |
|---|---|---|---|---|
| 4,984,279 A | * | 1/1991 | Kidney et al. | 382/113 |
| 5,155,774 A | * | 10/1992 | Numagami | 382/113 |
| 5,550,937 A | * | 8/1996 | Bell et al. | 382/293 |
| 5,631,970 A | * | 5/1997 | Hsu | 382/113 |
| 5,719,949 A | * | 2/1998 | Koeln et al. | 382/113 |
| 5,864,632 A | * | 1/1999 | Ogawa et al. | 382/113 |
| 6,064,760 A | * | 5/2000 | Brown | 382/154 |
| 6,445,399 B1 | * | 9/2002 | Sroka et al. | 715/767 |
| 6,597,818 B2 | * | 7/2003 | Kumar et al. | 382/294 |
| 6,681,056 B1 | * | 1/2004 | Tseng et al. | 382/282 |
| 6,694,064 B1 | * | 2/2004 | Benkelman | 382/284 |

* cited by examiner

Primary Examiner—Jingge Wu
Assistant Examiner—Jeffrey S Smith
(74) Attorney, Agent, or Firm—Cohen Pontani Lieberman & Pavane LLP

(57) ABSTRACT

A process and a device for the automatic rectification of images, where at least one image is rectified by a mapping function onto a reference image and at least some of the parameters of the mapping function are unknown are disclosed. The process includes at least an extraction of at least three objects from the image; a determination of at least three control points in the image, where characteristic points of the extracted objects are determined as control points; an assignment of the objects to objects in the reference image, where the objects in the two images are assigned on the basis of the similarity between the objects and/or on the basis of a vector grid, the vector grid being formed by connecting the characteristic object points, and a selection of a suitable mapping function and/or an adjustment of the parameters of the mapping function, where the mapping function is changed by changing the parameters in such a way that the cumulative error with respect to the positional differences between the projected control points and the corresponding points in the reference image is minimized.

18 Claims, 4 Drawing Sheets

PROCESS AND DEVICE FOR THE AUTOMATIC RECTIFICATION OF SINGLE-CHANNEL OR MULTI-CHANNEL IMAGES

BACKGROUND OF THE INVENTION

1. Field of the Invention

The invention pertains to a process and to a device for the automatic rectification of single-channel or multi-channel images, where an image is rectified onto a reference image without precise knowledge of the mapping function.

2. Description of the Related Art

Imprecise and/or insufficient knowledge of the mapping function is present especially when images are recorded by moving recording systems and/or moving image fields and the orientation of the recording system with respect to the image field cannot be determined clearly or can be determined only with extraordinary effort. For example, the mapping functions for rectifying satellite images for land surveying are not known or are known only within certain limits. It is also conceivable that the distortion of the reference image is not known or is known only within certain limits.

The images are recorded by a recording device and are then available for further processing as single-channel images, such as gray-scale images, or as multi-channel images, such as color images.

Images for recording and mapping the surface of the Earth are recorded by moving recording systems. The recording system can be located on, for example, a satellite or an aircraft. Known methods for recording and mapping the surface of the Earth are so-called photogrammetric processes, where the recorded images are rectified before they are transferred to the map to be prepared. The necessary transformation of a recorded image into the desired form of appearance is called the mapping process. So that rectification can be performed, the mapping process is modeled as a collinear equation. There are already several basic methods for georeferencing remote-acquired data, which are based either on the principle of calculating positions by means of a model of the mapping process (mapping model) or on the basis of the "control point principle" by means of a reference image. It is also possible to combine the two methods.

For rectification with the use of a mapping model, the mapping process is described as a collinear equation or is approximated by means of simpler models. If all the parameters of the mapping process are known, it is possible to generate very precise images. In practice, however, not all parameters which play a role in the formation of the image, such as the location and orientation of the satellite, are known with sufficient accuracy. The reasons for this are that there is a limit on the measurement accuracy and the fact that not all parameters are stable over time. This instability over time is the result, for example, of variations in the orbit of the satellite. In addition, the orbit of the satellite is measured discretely, and the interpolation between these points in time results in additional error.

It is also known that, in the case of incomplete or imprecise mapping parameters, rectification can be carried out with the help of control points. This process is used especially when the image to be rectified, a satellite image, for example, is mapped not onto a defined geometry such as map but rather onto a reference image with unknown distortion. Control points are high-contrast image structures, which are stable over time and which make it possible to determine locations by means of correlations. The interpolation between the control points is usually accomplished with two-dimensional polynomial functions. A source of error in control point rectification is the dissimilarity of the control point structures in the different images, caused by different recording geometries, by different conditions of the objects that form the control point structure, or by the averaging of different objects or parts of objects. Another source of error is the polynomial function used to perform the interpolation, since this function usually does make it possible to model the mapping process with sufficient accuracy. This is especially true in the case of large areas. The greater distance of a point from a control point, the greater the effects attributable to inaccuracies in the polynomial function. This effect is evident especially in the case of higher-order polynomials.

It is also known that the two methods, i.e., parametric rectification and rectification by means of polynomial functions, can be combined.

A disadvantage of the known methods is that they are difficult to automate, especially when the knowledge of the mapping process is very limited. It is usually a very complicated matter to adjust all the mapping parameters to an actual situation; this difficulty often leads to the use of pure polynomial rectification. The necessary control points are simply taken from a database. The previously known methods thus have residual errors in the position determination of the control points of the data set to be processed. This residual error cannot be described analytically at all or only with great effort, which means that it is impossible to adjust the parameters appropriately by correcting the mapping model.

SUMMARY OF THE INVENTION

The invention is therefore based on the technical problem of creating a process and a device for the automatic rectification of images by means of which the residual error can be reduced even in the absence of precise knowledge of the mapping model.

The problem is solved by a process for the automatic rectification of images, wherein at least one image is rectified by a mapping function onto a reference image, and at least some parameters of the mapping function are unknown. The process includes steps of extracting at least three objects from the image; determining at least three control points in the image, such that characteristic object points of the extracted objects are determined as control points; assigning the objects to objects in the reference image, such that assignment is made according to similarity between corresponding objects in the two images and/or on the basis of a vector arid formed by connections between the characteristic object points; and selecting a suitable mapping function and/or adjusting parameters of the mapping function, whereby the mapping function is changed by changing the parameters in such a way that cumulative error in positional differences between control points and corresponding points in the reference image is minimized.

The problem is further solved by a device for performing the aforesaid steps. The device includes an extraction module for extracting at least three objects from the image; a control point determination module for determining at least three control points in the image, wherein characteristic points of the extracted objects are determined as control points; an object assignment module for assigning the objects to objects in the reference image, such that a correspondence between the objects in the two images is established according to at least one of a similarity between objects, a vector grid formed by connecting characteristic object points, and a selection module. The correspondence is established for at least one of selecting a suitable mapping function and adjusting parameters of the mapping function, whereby the mapping function is changed by changing the parameters in such a way that cumulative error in positional differences between control points and corresponding points in the reference image is minimized.

Additional advantageous embodiments of the invention are apparent from other preferred embodiments of the invention, described herein below.

For the automatic rectification of an image onto a reference image, where at least some of the parameters of the mapping function for the rectification process are unknown, at least three objects are extracted from the image and at least three control points are determined. Characteristic points of the extracted objects are then determined as control points. The extracted objects are assigned to objects in the reference image, the objects of one image being assigned to those of the other on the basis of the similarity between the objects and/or on the basis of a vector grid, the vector grid being formed by connecting the characteristic object points. The parameters of the mapping function are adjusted and/or a suitable known mapping function is determined on the basis of the control points and the corresponding points in the reference image. The adjustment and/or determination is carried out in such a way that a minimum cumulative error is achieved for the positional differences between projected control points and the corresponding control points in the reference image. Mapping functions with fixed parameter sets are filed, for example, in a database. An adjustment of this type is of interest when many mapping process of the same type are present. So that suitable objects can be chosen, it is advantageous for the objects to have conspicuous and unique forms, so that gross errors can be excluded. The reference image can be mapped in a known map projection, or it can have an unknown mapping base. If the mapping base is known, the mapping function is taken from the mapping model. If the mapping base of the reference image is unknown, the mapping function will be an affine transformation. By adjusting the parameters to obtain the minimum cumulative error, the mapping function can be adjusted without precise knowledge of the mapping model and/or, if the mapping base is absent, without a mapping model at all.

In a preferred embodiment, the control points used to adjust the mapping function are weighted in another processing step. For this purpose, areas, i.e., so-called control point structures, are first formed around a possible control point of the image to be rectified and/or of the reference image. The areas are usually rectangular with N*N pixels, where N is any desired natural number. The control point structures are projected into the other image by means of the mapping function, the quality of the control point structure being described at least in terms of its variability, directional contrast, and/or similarity. The variability is derived from the previously determined class membership. Classes with low variability, such as water, generate high quality. Objects with high variability such as vegetation, however, have low quality. The values used for this type of quality evaluation can be determined in advance and filed in tables. Another criterion for the quality of a control point is directional contrast. For an exact determination of the positions of the control points, high contrast within the control point structure is required. Structures with high contrasts in the horizontal (X) and vertical (Y) directions of the image plane thus have high quality. The contrast is calculated on the basis of the maximum gray-scale differences in the rows or columns. Gray-scale values are recorded on one or more channels, e.g., on three channels, as so-called "color values". In an analysis of the gray-scale differences on a channel, either the contrast found in the image alone or preferably the contrast found in both the image and the associated reference image can enter into the quality index. In addition, similarity is a criterion for the quality index. The degree of similarity is found by comparing the form of the gray-scale curve in the X and Y directions within the control point structures of the gray-scale image with the form found for the reference image. Whereas the variability and the directional contrast in the image to be rectified and/or in the reference image are fixed, the similarity can be improved by making certain adjustments. The individual quality indices are linked to form an overall quality evaluation. There are many different methods that can be used for this type of linkage, and the individual quality indices can be weighted in different ways, depending on the task at hand. On the basis of the overall quality evaluation, a weighting is assigned to each control point, and the control points weighted in this way are then used to adjust the parameters for determining the mapping function. Control points that have a very low quality index should be excluded from any further processing.

In another embodiment, the positions of the control points obtained in the image to be rectified are determined more precisely by a comparison of the control point structures. It would be possible either to project parts of the control point structure of the image onto the reference image or to do the reverse. Image resolutions are preferably calculated for both image parts, and the less-resolved image part is projected onto the more highly resolved one. First, the gray-scale distribution or gray-scale distributions of the projected image structure are adjusted to the associated control point structure in the image to be rectified and/or in the reference image. It is thus possible to rectify the differences that result, for example, from different lighting conditions during the recording of the image in question. Then the gray-scale values of the individual pixels in the control point structure or image structure are determined, and the differences between adjacent pixels are found. These differences are compared with the differences between the corresponding pixels in the other structure, from which an error value is derived. Then the control point structure in the image to be rectified is shifted in the X or Y direction, and another error value is found. By the stepwise displacement of the control point structure in the X and Y directions, an error matrix is generated. The size of the individual steps is smaller than the dimension of the control point structure. The position of the control point structure that has the smallest error is identified as the best-adjusted position. Positions that have been determined in this way have high positional accuracy. As a result, the adjustment of the imaging parameters can be improved.

In a preferred embodiment, the parameters of the mapping function are adjusted, the mapping function being changed by changing the parameters in such a way that the cumulative error for the positional differences between the control points and the points of the associated projected image is minimized under consideration of the weighting of the control points. By means of a two-stage adjustment of the mapping parameters, a coarse rectification of the image is performed first, and this is then refined in a second stage. It is also conceivable, however, that the control points are already known within certain limits, which means that the first adjustment step can be omitted.

In another preferred embodiment, a rectification calculation is carried out which further reduces the residual error in the positional determinations. Here at least one vertical and/or one horizontal correction value is determined for each control point; these correction values embody the deviation of the value of the mapping function from the value of the compensating function at the site of the associated pixel for a projection using the best-adjusted mapping function. The correction values thus obtained can be stored in a correction table and used for further processing. The best-adjusted mapping function is next determined. In many cases, however, a residual error of the best-adjusted mapping function in comparison with the function on which the mapping process is actually based is unavoidable and/or avoidable only with extreme effort. With the help of the correction function taken from the correction table, it is then possible to rectify an image with high quality even if the best-adjusted mapping function still contains residual error.

In another embodiment, the corner coordinates of projected image elements are determined. An image position of the corner coordinates is obtained from a projection using the determined mapping function and the correction values. By interpolation of the correction values of the control points, it is possible to set up a correction function. Thus the correction values can be determined at the corner coordinates.

In another embodiment, resampling is then carried out in such a way that the corner coordinates mark out a polygon, preferably a rectangle, and the gray-scale values of all the image elements lying within the polygon, weighted according to their size, are averaged.

In another preferred embodiment, objects are extracted by a classification process and/or a geometric structure analysis. In the classification process, the properties of the image are analyzed, and objects and/or areas with similar properties are assigned to the same class. Image segments whose elements (pixels) all belong to one class are called objects and/or areas with the same class membership. Classification is based on image properties. These properties can pertain to individual pixels. One property that pertains to a pixel is, for example, a gray-scale value in a channel, which is determined by the reflective behavior of the surface corresponding to the pixel in a defined range of wavelengths. In addition, properties can pertain to several pixels, for which the spatial arrangement of individual gray-scale values plays a role, such as in the case of texture. Another property is obtained from the reflective behavior of the surface in various wavelength ranges (spectral property). On the basis of certain properties, objects can be divided into classes, such as into land use classes such as agriculture, coniferous forest, etc. In particular, clouds and areas with stable reflective behavior such as water or coniferous forests can be recognized in this way. By means of a mask, the image objects which have been recognized as clouds can be labeled. Cloud areas are then excluded from further processing or, if necessary, can be subjected to processing separately. If multispectral remotely-acquired sensing data are available, objects are preferably detected and identified according to a classification method described in German patent DE 199 39 732 C2.

The objects classified on the basis of their properties can then be classified more accurately by a geometric structure analysis. The geometric structure analysis comprises, for example, an analysis of the objects themselves, including consideration of their size, shape, and/or homogeneity. Preferably information on adjacent objects is also included. For example, image elements in transition regions can be assigned to an object.

For this purpose, the edge contours of suitable, classified areas are determined in the first step; in addition, a numerical characterization of these objects is done by means of a suitable structure index. The objects which are adjacent to clouds can be labeled separately. These objects are then correlated with corresponding objects of the reference image, so that, as a result, the objects are pre-extracted and identified.

The positions of the various derived characteristic object points, preferably object center points, are then calculated from the extracted objects. If desired, a search is made for characteristic edge contours in cases where objects are partially covered by clouds.

The images are generated by any desired recording device, which can produce either single-channel or multi-channel images. A suitable recording device is, for example, a pushbroom camera. The recording device is attached to any desired object that moves relative to the surface to be recorded. It is also conceivable that the surface could be moving relative to the recording device.

The device according to the invention comprises individual modules. The individual modules can be integrated either into a common computing unit or into separate ones. A suitable computing unit could be, for example, a PC, a workstation, and/or a computer cluster. Some of the steps of the process can be processed in parallel.

BRIEF DESCRIPTION OF THE DRAWINGS

The invention is explained in greater detail below on the basis of a preferred exemplary embodiment and the accompanying drawings, wherein.

DETAILED DESCRIPTION OF THE PRESENTLY PREFERRED EMBODIMENTS

Figure 1:
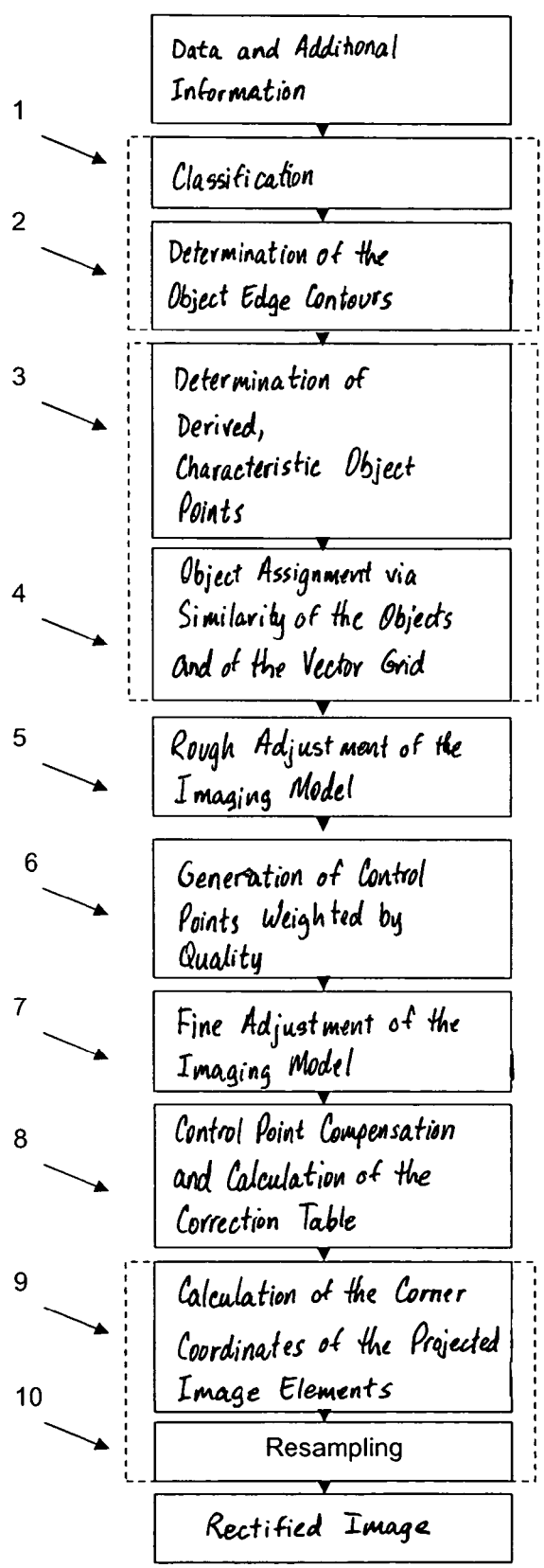
FIG. 1 shows the sequence of steps involved in the automatic rectification of a satellite image.
Figure 1:
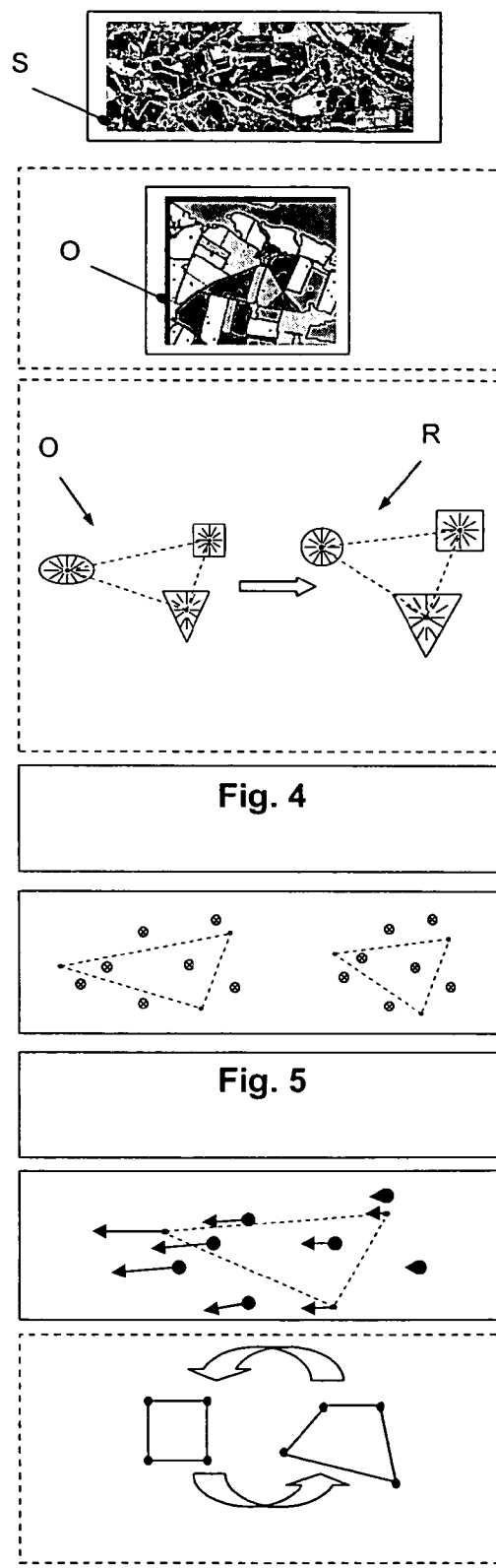

Referring now to FIG. 1, which shows a schematic diagram of the sequence of events that occurs during the automatic rectification of a single-channel or multi-channel image onto a reference image. The method is built in modular fashion by the use of the modules 1-10. All of the information necessary for the rectification process is extractable from the data of the image or of the reference image. The rectification onto the reference image is thus possible without knowledge of the mapping function. If additional information is available, it can also be used in the process. For rectification, it is sufficient that the image and the reference image be present as single-channel, gray-scale images. In modules 1-4, a rough correspondence between image and reference image is achieved with the help of classified objects and their relationships to each other. On the basis of this rough correspondence, a roughly adjusted virtual map is produced in module 5. In modules 6-8, the adjustment of the virtual map is refined. The result obtained from modules 6-8 is a final mapping function with a correction table. Gray-scale percentage values are assigned to surfaces (pixels) in steps 9 and 10.

The process is illustrated on the basis of the example of the rectification of a satellite image S. The satellite image S is recorded, for example, by a pushbroom camera. The pushbroom camera consists of a row of sensors. By the forward movement of the satellite or of some other moving object such as an aircraft, the satellite image is formed by putting the individual rows together.

In module 1, the satellite image S is first studied to determine the presence of certain image properties. Relevant properties are, for example, the albedo value, that is, the ratio of reflected radiation to incident radiation; color or gray-scale values; and/or textural properties of a recorded surface. On the basis of these properties, the image objects can be divided into classes, such as into land use classes such as agriculture, coniferous forest, etc. Fractional parts of the image are thus classified in the next step according to their properties, and areas of the same class membership are formed. For the classification process, a suitable classification algorithm is used, by means of which, for example, areas with stable reflective behavior such as the surfaces of bodies of water can be identified.

Objects are identified in module 2; the edges of the objects are the contours of the areas they form; and a structure analysis model, for example, can be used to give an object a numerical characterization on the basis of its structure index. The edge contours of the objects make it possible to describe the shapes of the individual objects. A description of the various object shapes is a prerequisite for being able to determine the same objects in both the reference image and in the satellite image.

Figure 2:
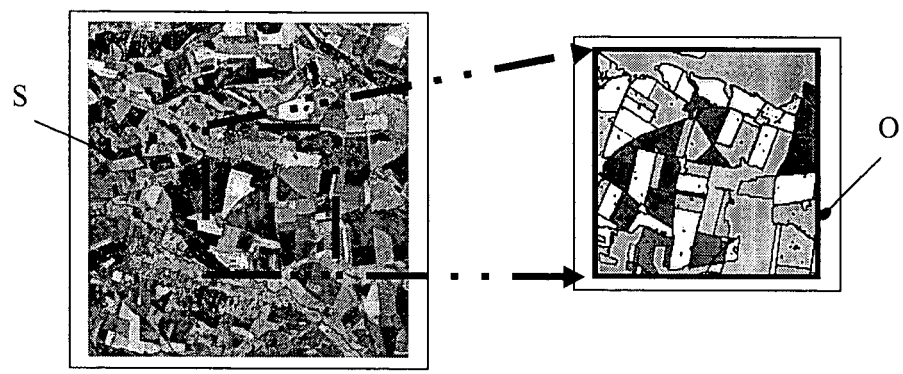
FIG. 2 shows a schematic diagram of the generation of object edges by classification and geometric structure analysis.

FIG. 2 illustrates in schematic fashion how, by means of classification and geometric structure analysis, an image O is obtained, from which the edges of the individual objects can be derived.

In module 3, the center points of the objects are calculated on the basis of the object edges which were previously determined; these center points indicate the positions of the objects. The satellite image S is rectified by a mapping function, either unknown or only partially known, onto a reference image. The object centers and other significant points of the object geometry are used as control points for adjustment of the mapping function.

In module 4, each of the significant extracted objects according to image O is assigned to an object of the reference image R, and/or extracted objects are identified. It must be remembered here that the objects are shown distorted, and therefore an assignment on the basis of object area shapes is possible to only a limited extent. The job of assigning identifications is therefore accomplished according to the invention with the additional help of vector grids, which can be used to link objects within image O and within the reference image R. To generate a vector grid, at least three significant objects are required. Objects can be spatially assigned and/or identified by an analysis of the geometric similarity of the vector grids.

Figure 3:
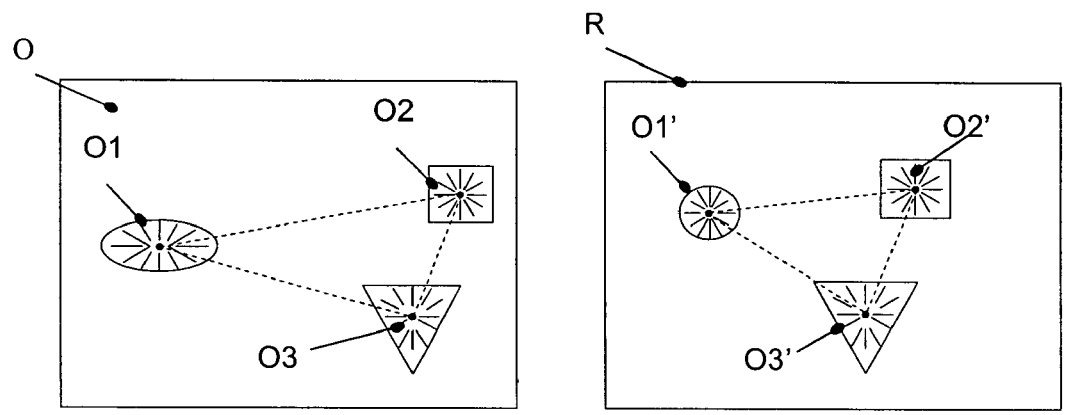
FIG. 3 shows schematic diagrams of parts of an image and of a reference image.

FIG. 3 shows in schematic fashion part of an image O and part of a reference image R. In each of the two images, i.e., image O and reference image R, three significant objects O1, O2, O3 and O1', O2', O3' have been discovered, and their center points have been identified as significant object points and selected as control points. The control points are connected by a vector grid. The objects O1, O2, O3 and the vector grid of the image O are distorted in comparison with the reference image. The objects O1, O2, O3 therefore cannot be assigned directly to the objects O1', O2', O3' and thus identified. By means of an analysis of the geometric similarity of the vector grids, however, objects O1, O2, O3 can be assigned spatially to the objects O1', O2', O3' and thus identified.

In module 5, the unknown or only partially known mapping function is first adjusted to the control points determined in modules 1-4. The original parameter set is calculated from the geometric relationships of the objects to each other. The adjustment is made by changing the parameters of the mapping function.

Figure 4:
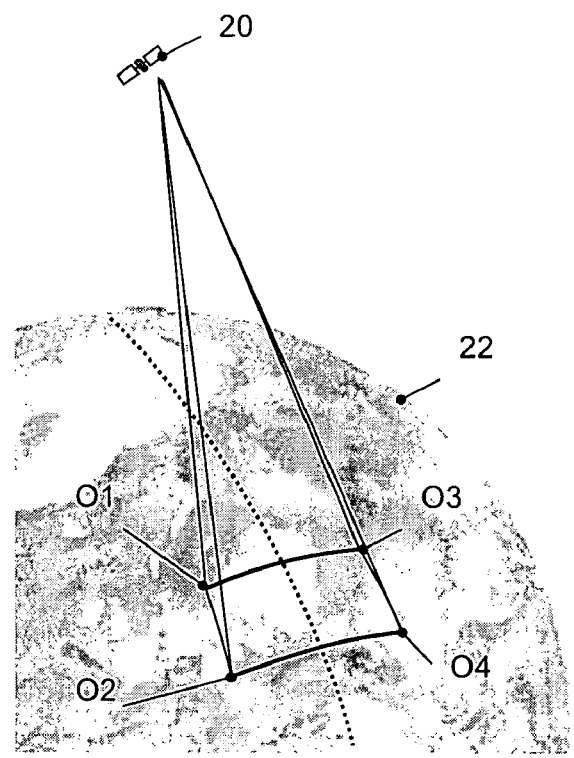
FIG. 4 shows a schematic illustration of the determination of a mapping function on the basis of geometric relationships.

FIG. 4 illustrates the determination of a mapping function on the basis of geometric relationships. Images from the Earth's surface 22 are recorded by a satellite 20. A search is made for a mapping function by means of which the geometric relationships of objects O1-O4 of the Earth's surface to each other can be retained as precisely as possible.

In module 6, additional control points for the adjustment of the mapping function are generated. In principle, any point which can be uniquely identified in both images is suitable as a control point. Potential control points, however, are to be evaluated differently with respect to their suitability. For this purpose, the quality characteristics of the control point structures are determined in module 6. Control point structures are areas with N*N pixels, which lie around a potential control point. The size of the control point structures is a compromise between the ideal, dimensionless control "point" and an image structure which can be recognized again. Suitable control point structures are, for example, 3×3 or 5×5 pixels in size. The quality characteristics are based on variability, directional contrast, and the similarity. The variability of a control point structure is derived from its class membership in correspondence with module 1. A high level of variability has a negative effect on the quality evaluation of the control point. So that the position of the control point can be determined in a following step of the process with a high degree of accuracy, high contrast within the control point structure is advantageous. A high quality index is therefore assigned to a structure with high directional contrasts. The similarity between two structures is very important for comparisons of the projected image with the reference image, because, if the similarity is insufficient, the accuracy of the positioning drops significantly. The quality index is therefore proportional to the similarity. A weighting is assigned to each control point in correspondence with its quality characteristic. Control point structures and the associated quality characteristics are filed in a control point table.

A new adjustment of the parameters of the mapping function is carried out in module 7 with the larger number of control points and their weighting. This improves the accuracy of the mapping function.

Figure 5:
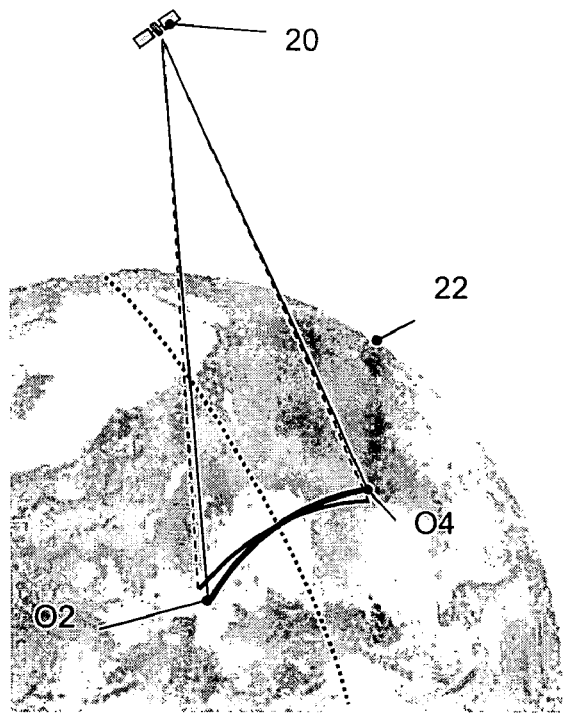
FIG. 5 shows a schematic illustration of the determination of an improved mapping function on the basis of geometric relationships.

FIG. 5 illustrates how the adjustment of the parameters improves the determination of the mapping function. The mapping function is determined by a large number of factors in play at the time the image is recorded. For example, the orientation of the satellite 20 has an effect on an image recorded of the Earth's surface 22. The orientation of the satellite 20 and other factors, however, are usually known only within certain limits. The mapping function is adjusted by varying at least one parameter in such a way that the positional error in the image is minimized. The adjustment is done without knowledge of the orientation of the satellite 20 and/or of other factors present at the time the image was recorded.

Residual positional errors which were not completely avoided by the improved mapping function are dealt with by a compensating calculation in module 8. It is assumed here that the residual positional error will not change sharply over short distances. The compensating calculation therefore includes the near surroundings. As a result of the compensating calculation, an error correction table is constructed in module 8. By interpolation of the error correction table, an error correction function can be found.

Figure 6:
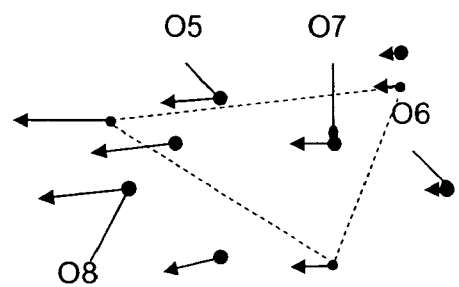
FIG. 6 shows a schematic diagram of correction values for a mapping function.

FIG. 6 illustrates the correction table. The correction values are indicated by arrows. Different correction values are assigned to the individual objects O6-O8, as illustrated by the different lengths of the arrows.

In module 9, corner coordinates of the projected image elements are calculated. The calculation is done with the use of the previously obtained mapping function and the error correction function. Finally, resampling is carried out in module 10, using the previously calculated projected positions.

Figure 7:
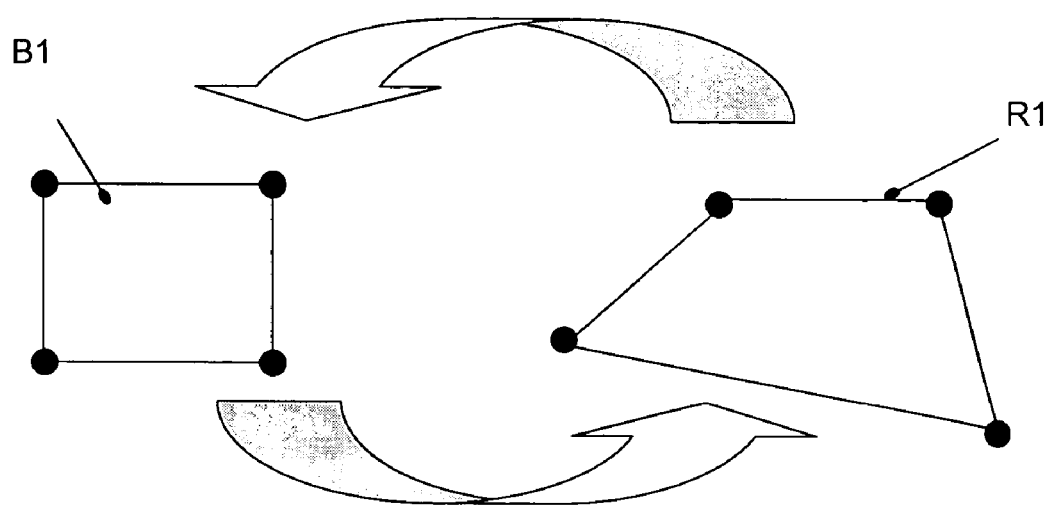
FIG. 7 shows a schematic diagram of an rectification carried out on the basis of a mapping function.

FIG. 7 illustrates the rectification of an image obtained on the basis of the mapping function found, with error correction, where an image structure B1 is projected onto a reference structure R1.

What is claimed is:

1. A process for automatic rectification of images, wherein an image is rectified by a mapping function onto a reference image, and at least some parameters of the mapping function are unknown, said process comprising:

extracting at least three objects from the image;

determining at least three control points in the image, such that characteristic object points of the extracted objects are determined as control points;

obtaining positions of the at least three control points in the image, and comparing control point structures in the image to be rectified to control point structures in the reference image, each of the control point structures comprising a plurality of pixels;

calculating a resolution of the image and the reference image for an image area to determine which image area is less-resolved and which image area is more highly resolved, said image area of the image to be rectified comprising a control point structure and said image area of the reference image comprising a control point structure corresponding to the control point structure in the image to be rectified;

projecting the less-resolved image area onto the more highly resolved image area corresponding to at least one suitable mapping function;

determining gray-scale values of respective pixels in the control point structure of the image and in the corresponding control point structure of the reference image;

forming differences of gray-scale values between adjacent pixels in the control point structure of the image and forming differences of gray-scale values between adjacent pixels in the corresponding control point structure of the reference image;

comparing said differences in the corresponding control point structures between adjacent pixels in the control point structure of the image with said differences of gray-scale values of adjacent pixels in the corresponding control point structure of the reference image to derive an error value;

shifting the control point structure in the image in at least one of a vertical and horizontal direction such that a new position of the control point structure is obtained, said error value being determined by comparing said differences in the corresponding new control point structure between adjacent pixels in the new control point structure of the image with said differences of gray-scale values of adjacent pixels of the corresponding new control point structure of the reference image;

assigning the at least three objects to objects in the reference image, such that assignment is made according to at least one of similarity between corresponding objects in the two images and based on a vector grid formed by connections between the characteristic object points; and selecting one of a suitable mapping function and adjusting parameters of the mapping function based on the error values, whereby the mapping function is changed by changing the parameters such that cumulative error in positional differences between control points and corresponding points in the reference image is minimized.

2. The process according to claim 1, further comprising:

generating weighted control points for forming the control point structure, comprising a limited number of pixels, around the control point of at least one of the image and the reference image; and projecting the control point structure, using the mapping function, onto the image serving as the image structure for determining whether there is also a corresponding image structure of sufficient quality, wherein the quality of the control point structure is measured by at least one of its variability, directional contrast and similarity, and weighting of the control points on the basis of said control point structure quality.

3. The process according to claim 2, further comprising:

adjusting a position of the control point in at least one of the image and the reference image;

adjusting, for at least one channel, a control point structure gray-scale value distribution form in the reference image, and a control point structure gray-scale value distribution form of the image structure in the image, to each other; and determining, in at least one of the image and the reference image, whether there is at least one first difference between the gray-scale values of two adjacent pixels of the control point structure and at least one second difference between gray-scale values of corresponding pixels in the image structure.

4. The process according to claim 2, further comprising adjusting at least one of individual parameters of the mapping function and a selection of a suitable mapping function, such that a change of the mapping function is made by said adjusting such that a cumulative error of positional differences between projected control points and corresponding weighted control points in the reference image is minimized.

5. The process according to claim 1, further comprising performing a compensating calculation using a correction function, wherein, for at least two control points, at least one vertical and one horizontal correction value is determined, said correction values correcting for positional difference between a projected control point and a corresponding control point in the reference image, and wherein the correction function is determined as a function of the correction values.

6. The process according to claim 5, further comprising projecting corner coordinates of an image element onto image positions, wherein image positions of the corner coordinates are determined from the mapping function and the correction function.

7. The process according to claim 6, further comprising:

performing a resampling;

wherein corner coordinates define a polygon and gray-scale values determine a final gray-scale value from a correspondence with a percentage of areas of all image elements lying within the polygon.

8. The process according to claim 1, wherein said step of extracting comprises performing at least one of a classification and a geometric structure analysis, said process further comprising:

analyzing properties of the image and forming at least one of objects and areas of like classifications, if classification is performed; and if the geometric structure analysis is performed, determining an edge contour of an object from contours of an area and numerically characterizing objects are a structure index.

9. A device for automatic rectification of images, wherein an image is rectifiable by a mapping function onto a reference image, and at least some parameters of the mapping function are unknown, said device comprising:

an extraction module for extracting at least three objects from the image;

a control point determination module for determining at least three control points in the image, wherein characteristic points of the extracted objects are determined as control points;

an object assignment module for assigning the objects to objects in the reference image, such that a correspondence between the objects in the two images is established according to at least one of similarity between objects and a vector grid-formed by connecting characteristic object points;

a selection module for at least one of selecting at least one suitable mapping function and adjusting parameters of the mapping function based on error values, whereby the mapping function is changed by changing the parameters such that cumulative error in positional differences between control points and corresponding points in the reference image is minimized; and a module for obtaining positions of the at least three control points in the image;

wherein control point structures in the image to be rectified are compared to control point structures in the reference image, each of the control point structures comprising a plurality of pixels, wherein a resolution of the image and the reference image for an image area are calculated to determine which image area is less-resolved and which image area is more highly resolved, said image area of the image to be rectified comprising a control point structure and said image area of the reference image comprising a control point structure corresponding to the control point structure in the image to be rectified, wherein the less-resolved image area is projected onto the more highly resolved image area corresponding to the at least one suitable mapping function, wherein gray-scale values of respective pixels in the control point structure of the image and in the corresponding control point structure of the reference image are determined, wherein differences of gray-scale values between adjacent pixels in the control point structure of the image are formed and differences of gray-scale values between adjacent pixels in the corresponding control point structure of the reference image are formed, wherein said differences in the corresponding control point structures between adjacent pixels in the control point structure of the image are compared with said differences of gray-scale values of adjacent pixels in the corresponding control point structure of the reference image to derive an error value, and wherein one of the control point structure in the image and the reference image in at least one of a vertical and horizontal direction is shifted such that a new position of the control point structure is obtained, said error value being determined by comparing said differences in the corresponding new control point structures between adjacent pixels in the new control point structure of the image with said differences of gray-scale values of adjacent pixels of the corresponding new control point structure of the reference image.

10. The device according to claim 9, further comprising a module for generating weighted control points, by means of which the control point structure comprising a limited number of pixels is formed around the control point of at least one of the image and the reference image;

wherein the control point structure is mapped by the mapping function onto the image serving as the image structure, the quality of the control point structure is measured by at least one of its variability, directional contrast and similarity, and weighting of the control points is determined on the basis of said control point structure quality.

11. The device according to claim 10, wherein the form of a gray-scale distribution of the control point structure and the form of the gray-scale distribution of the image structure are relatively adjustable on at least one channel, and wherein at least one first difference between gray-scale values of two adjacent pixels of the control point structure, and at least one second difference between gray-scale values of corresponding pixels of the image structure, are formed.

12. The device according to claim 10, further comprising a module for adjusting the parameters of the mapping function, wherein the mapping function is changed by changing the parameters such that a cumulative error of positional differences between weighted control points and associated projected image points is minimized.

13. The device according to claim 9, further comprising a module for performing a compensating calculation for determining at least one correction value in a vertical direction and one correction value in a horizontal direction, the correction values correcting the deviation of the value of the mapping function from the value of the compensating function at the location of the control point.

14. The device according to claim 9, further comprising a module for mapping corner coordinates of an image element onto image positions, wherein the image positions of the corner coordinates are determined from the mapping function and the correction function.

15. The device according to claim 9, further comprising a module for performing a resampling, wherein the corner coordinates define a polygon, and wherein gray-scale values determine a final gray-scale value from a correspondence with a percentage of areas of all image elements within said polygon.

16. The device according to claim 9, wherein said extraction module includes means for performing at least one of a classification and a geometric structure analysis, wherein in said classification process, properties of the image are analyzed and at least one of objects and areas of like class membership are formed; and in said geometric structure, analysis includes at least one of determining an edge contour of an object from an edge contour of an area and numerically characterizing the object by a structure index.

17. The process according to claim 7, wherein said polygon is a rectangle.

18. The device according to claim 15, wherein said polygon is a rectangle.

* * * * *